Oct. 16, 1951  J. C. DOOLITTLE ET AL  2,571,548
BASKET COVER FASTENER
Filed Feb. 13, 1948
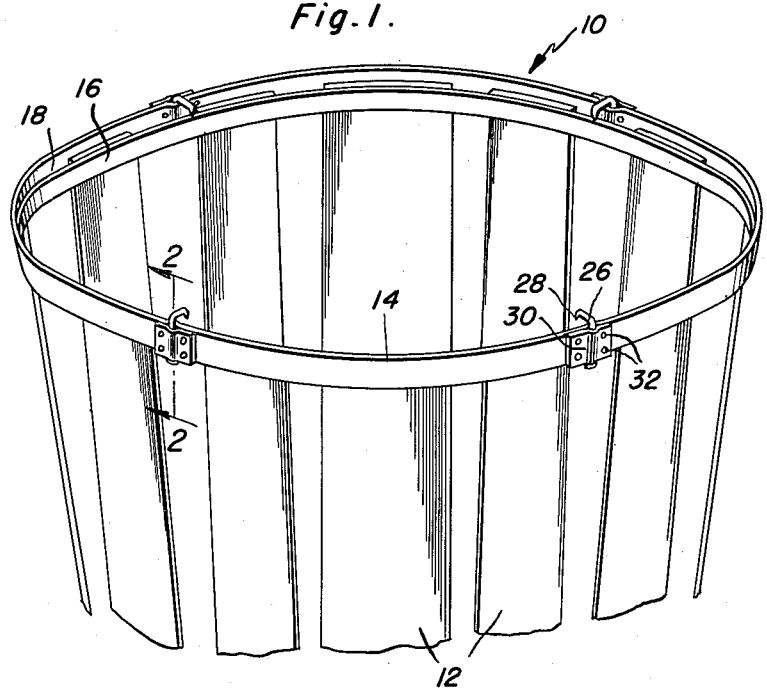
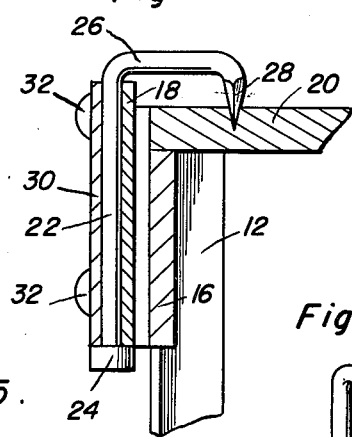
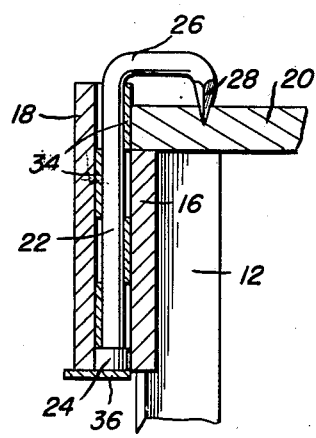
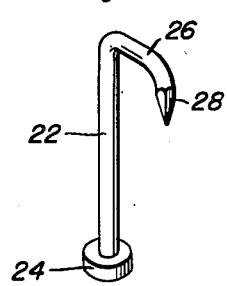
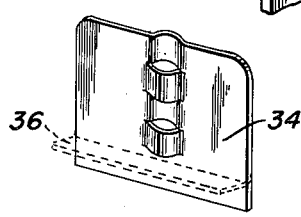
James C. Doolittle
Eugene A. McCabe
INVENTORS Patented Oct. 16, 1951

2,571,548

UNITED STATES PATENT OFFICE 2,571,548

BASKET COVER FASTENER

James C. Doolittle and Eugene A. McCabe,
Bell Glade, Fla.

Application February 13, 1948, Serial No. 8,186

2 Claims. (Cl. 217—69)

1

This invention comprises novel and useful improvements in basket cover fasteners and more specifically pertains to a readily engageable and releasable fastening means for removably securing the cover to a fruit basket or the like.

The principal object of this invention is to provide an inexpensive, efficient form of detachable fastening means for the covers of fruit baskets and the like, which may be readily applied to and carried by a reinforcing rim of the basket.

An important feature of the invention is the provision of a pointed hook fastener having a shank for swivelly mounting the same upon the reinforcing rim of a basket, and which may be readily turned into cover engaging and releasing position as required.

A further feature of the invention resides in the provision of a novel mounting means for securing the swivel shank of the fastener hook to the reinforcing band of a fastener, this fastening means being capable of mounting between the laminations of plywood making up the reinforcing rim.

And a final feature of the invention to be specifically enumerated herein resides in the provision of a swivelled fastener as set forth in the preceding objects and features of the invention, in which the shank of the fastening hook is swivelly mounted in a metal plate which may be readily applied to the exterior surface of or between the laminations of the reinforcing rim of a basket.

These, together with various ancillary objects and features of the invention which will later become apparent as the following description proceeds, are attained by this device, preferred embodiments of which have been illustrated by way of example only in the accompanying drawings, wherein:

Figure 1 is a fragmentary perspective view showing an embodiment of a basket having a reinforcing rim to which the fastening means of the present invention has been attached;

Figure 2 is a fragmentary vertical transverse sectional detailed view taken upon an enlarged scale substantially in the plane of the section line 2—2 of Figure 1 and showing the manner by which the fastener hook engages the cover of a basket;

Figure 3 is a view similar to Figure 2, but showing a modified form of attaching means for securing the hook to the rim of the basket;

Figure 4 is a perspective view of the fastening

2 element with which the present invention is concerned, and;

Figure 5 is a perspective view of an element of the embodiment of Figure 3.

Referring now more specifically to the accompanying drawings, wherein like numerals designate similar parts throughout the various views, attention is directed first to Figure 1, wherein the numeral 10 indicates generally any suitable form of light-weight wooden basket for storing fruits or vegetables or the like, and which is provided with a plurality of slats or splints 12 forming the sides thereof, and which at their lower ends are attached to any suitable bottom, not shown. At various points throughout their length, the side slats 12 are reinforced by one or more reinforcing bands of plywood, metal or similar construction, the topmost reinforcing band, with which the present invention is concerned, being indicated at 14 in Figure 1.

As will be seen by reference to Figures 1, 2 and 3, the reinforcing rim 14 consists of an inner rim 16, which has its upper end terminating in substantially the same plane as the upper ends of the slats 12, together with an outer rim 18 which extends slightly above the inner rim, for a purpose to be later described.

Preferably, the inner and outer rims are formed together as a laminated rim, being secured together for this purpose in any suitable manner. A generally annular cover or other shape corresponding to the shape of the basket, is adapted to rest within the inner circumference of the outer rim 18 and upon the upper surface of the inner rim 16, as indicated at 20 in Figures 2 and 3. To retain the cover 20 in position upon the basket, and to release the same if desired, the novel swivelling fasteners forming the subject of this invention are employed. These fasteners include a metal shank 22, provided with a headed annular lower portion 24 at one end thereof, while the upper end of the shank is bent upon itself at right angles thereto to provide an arm 26, whose outer extremity is downwardly turned in a direction parallel to that of the shank 22 and constitutes a sharpened hook or point 28. In the embodiment shown in Figures 1 and 2, a plurality of the fasteners are swivelly connected to the outer surface of the outer band 18, being secured thereto as by metallic fastening plates 30 secured to the reinforcing band as by rivets, staples or other fasteners 32. When so mounted, it will readily be seen that the hook 28 may be swivelled about the shank 22 in the bearing afforded by the plate 30, whereby the hook may be selectively disposed over the cover 20 and imbedded therein, or may be turned to one side to permit disengagement of the cover as desired.

It will of course be understood that if desired, the shank 22 of the hook could be received between the inner and outer members of the laminated reinforcing band 14, that is, between the members 16 and 18, and retained therein by suitable fastening means corresponding to the means 32, disposed on both sides of the shank. The operation of the device would be the same as just described.

Alternatively, and for heavier types of construction, the arrangement shown in Figure 3 may be employed. Here, the same construction of basket is utilized, and as before includes the side slats 12, the reinforcing band having the laminated portions 16 and 18, and a cover 20 for the basket. The same construction of fastener having a shank 22, headed annular lower end 24, perpendicular arm 26 and pointed prong or hook 28, is utilized.

In this embodiment, however, the shank 22 threaded between and journalled in oppositely disposed loop portions 34 formed in a metallic plate, of sheet metal or the like, provided with a lower end which is turned upon itself to provide a horizontally disposed section 36. This plate together with the shank of the fastener is secured between the laminated sections 16 and 18 of the reinforcing rim at the top of the basket, whereby the plate 36 engages the lower surface of the collar 24 to urge the same against the lowermost loop 34, to thereby retain the shank in the plate against relative displacement therefrom. The plate is secured between the sections by fastening means such as in the preceding embodiments, and obviously is operated in the same manner. However, the metallic plate provides a much more sturdy supporting bearing and swivelling fastening means for the hook, and also distributes the strain imposed upon the reinforcing band by the hooks more evenly throughout the length of the band.

From the foregoing, the manner of constructing and utilizing the invention will be readily understood and further explanation is believed to be unnecessary.

However, numerous modifications will readily occur to those skilled in the art after a consideration of the foregoing specification and accompanying drawings, and it is not intended to limit the invention to the exact construction shown and described, but all suitable modifications and equivalents may be resorted to falling within the scope of the appended claims.

Having described the invention what is claimed as new is:

1. In combination, a basket having a reinforcing rim about its exterior upper portion, said reinforcing rim comprising inner and outer bands, a cover supported upon the reinforcing rim within the outer band and resting directly upon the inner band, a cover fastener comprising a fastener plate secured in said reinforcing rim between said inner and outer bands, a shank swivelled on said plate and positioned entirely beyond the rim of the cover and a pointed extremity on said shank embedded in said cover, said plate including a flange extending laterally therefrom, said flange seating upon the undersurface of said reinforcing rim.

2. In combination, a basket having a reinforcing rim about its exterior upper portion, said reinforcing rim comprising inner and outer bands, a cover supported upon the reinforcing rim within the outer band and resting directly upon the inner band, a cover fastener comprising a fastener plate secured in said reinforcing rim between said inner and outer bands, a shank swivelled on said plate and positioned entirely beyond the rim of the cover and a pointed extremity on said shank embedded in said cover, said plate including a flange extending laterally therefrom and seating upon the undersurface of the outer band.

JAMES C. DOOLITTLE.
EUGENE A. McCABE.

REFERENCES CITED

The following references are of record in the file of this patent:

UNITED STATES PATENTS

| Number | Name | Date |
|---|---|---|
| 221,203 | Winne | Nov. 4, 1879 |
| 964,912 | Hendrix | July 19, 1910 |
| 1,032,980 | Baker et al. | July 16, 1912 |
| 1,787,202 | Kendall | Dec. 30, 1930 |
| 1,947,393 | Hargroves | Feb. 13, 1934 |
| 2,008,632 | Wener | July 16, 1935 |